United States Patent [19]
Stephen et al.

[11] Patent Number: 6,102,029
[45] Date of Patent: Aug. 15, 2000

[54] BURNER ASSEMBLY FOR A GAS BARBECUE GRILL

[75] Inventors: Robert T. Stephen; Erich J. Schlosser; Edna Schlosser, all of Barrington; Mohammed Shoeb, Hoffman Estate, all of Ill.

[73] Assignee: Weber Stephen Products Co., Palatine, Ill.

[21] Appl. No.: 09/374,820

[22] Filed: Aug. 13, 1999

[51] Int. Cl.[7] ................................................ A47J 37/00
[52] U.S. Cl. ........................................ 126/41 R; 431/286
[58] Field of Search ........................... 126/41 R; 431/286

[56] References Cited

U.S. PATENT DOCUMENTS

| | | |
|---|---|---|
| 923,348 | 6/1909 | Fey . |
| 1,103,992 | 7/1914 | Murray . |
| 1,133,850 | 3/1915 | Garraux . |
| 1,224,157 | 5/1917 | Fry . |
| 1,548,185 | 8/1925 | Carr . |
| 1,954,476 | 4/1934 | Gloekler . |
| 2,097,793 | 11/1937 | Howell . |
| 2,304,140 | 12/1942 | Bergholm . |
| 2,881,695 | 4/1959 | Di Pietro . |
| 3,348,472 | 10/1967 | Anetsberger et al. . |
| 3,369,481 | 2/1968 | Pappas . |
| 3,418,921 | 12/1968 | Fautz . |
| 3,545,908 | 12/1970 | Lohman . |
| 3,794,013 | 2/1974 | Upton . |
| 3,824,984 | 7/1974 | Swanson . |
| 3,871,355 | 3/1975 | Henry . |
| 3,931,805 | 1/1976 | Nelson . |
| 4,089,258 | 5/1978 | Berger . |
| 4,402,300 | 9/1983 | Houck . |
| 4,485,972 | 12/1984 | Freber . |
| 4,587,948 | 5/1986 | Haglund . |
| 4,627,408 | 12/1986 | Schlosser . |
| 4,677,964 | 7/1987 | Lohmeyer et al. . |
| 4,727,853 | 3/1988 | Stephen et al. . |
| 4,891,005 | 1/1990 | Carter . |
| 4,989,579 | 2/1991 | Murphy et al. . |
| 5,213,075 | 5/1993 | Stephen et al. . |
| 5,279,277 | 1/1994 | Barker . |
| 5,313,928 | 5/1994 | Rodgers et al. . |
| 5,421,319 | 6/1995 | Moore, Jr. et al. . |
| 5,765,469 | 6/1998 | Schlosser et al. . |
| 5,873,355 | 2/1999 | Schlosser et al. . |

*Primary Examiner*—Carroll Dority
*Attorney, Agent, or Firm*—Wallenstein & Wagner, Ltd.

[57] ABSTRACT

An improved burner assembly for use in a gas barbecue grill having a cooking chamber and a fuel supply is disclosed. The burner assembly includes a plurality of burners forming a burner grid with at least two of the burners defining a periphery of the grid and the remaining burners confined within the interior of the grid. The periphery burners are preferably designed with a plurality of openings which direct a flame toward a center vertical plane, while the interior burners preferably direct a flame, by placement of openings, in a substantially vertical direction. Additionally, the interior burner tubes are attached to a crossover tube via a keyed connecting mechanism which prevents improper connections or assembly.

25 Claims, 4 Drawing Sheets

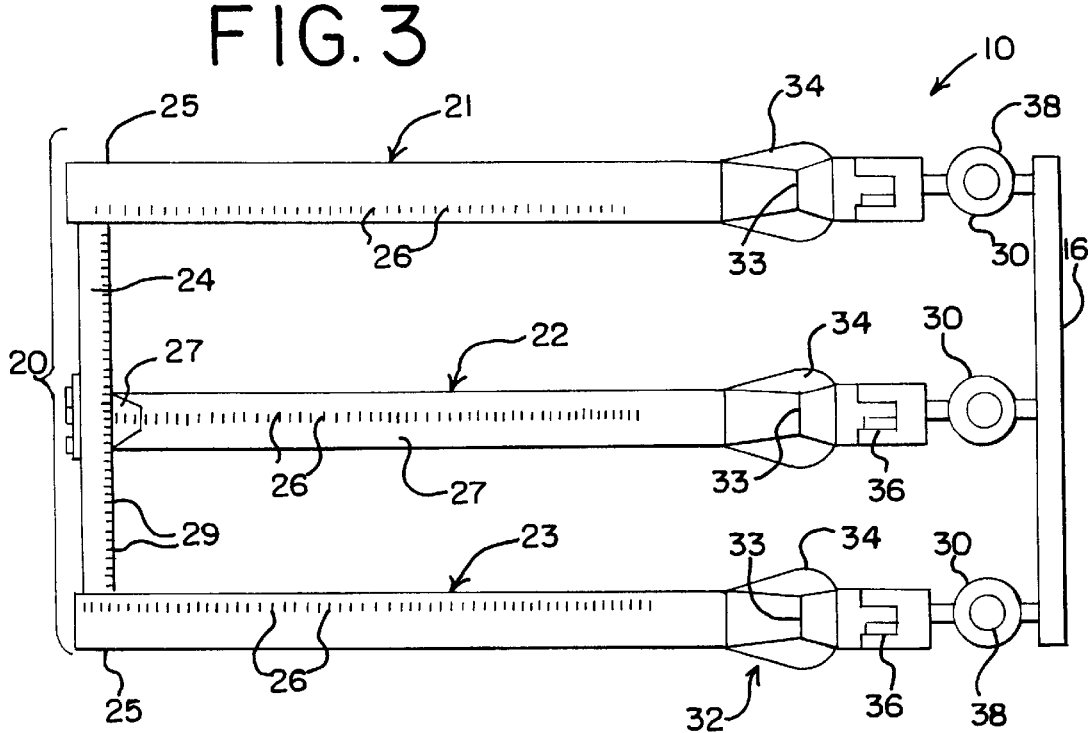
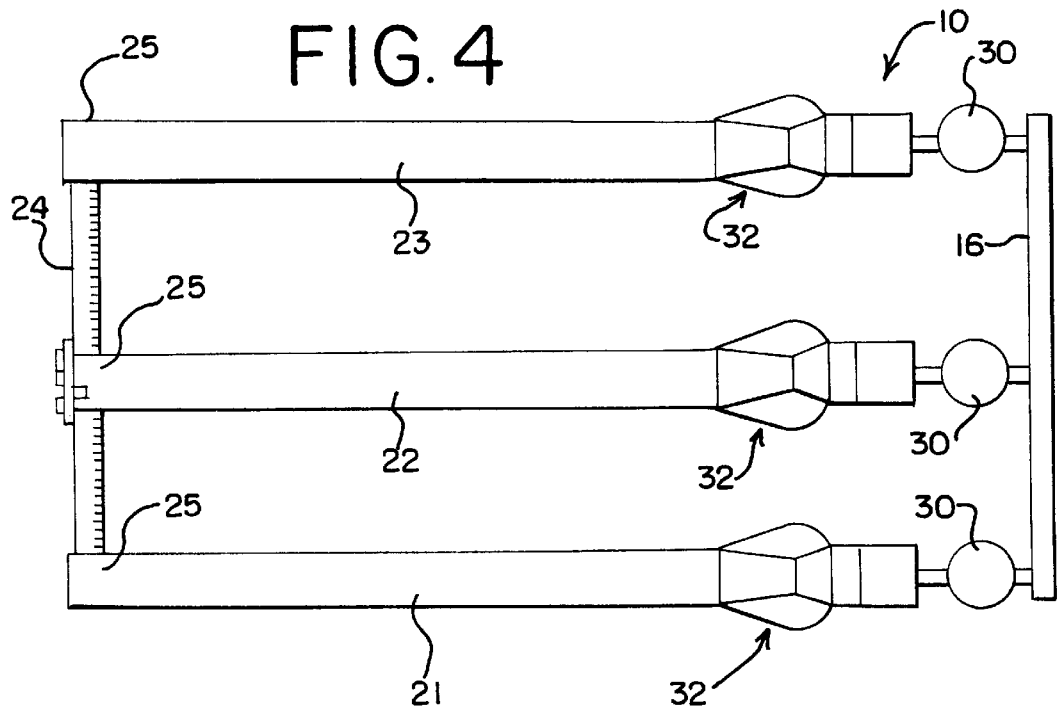

BURNER ASSEMBLY FOR A GAS BARBECUE GRILL

TECHNICAL FIELD OF THE INVENTION

The present invention relates generally to the field of gas barbecue grills. Particularly, the present invention relates to an improved burner assembly used in a barbecue grill.

BACKGROUND OF THE INVENTION

Gas barbecue grills have become very popular as outdoor cooking devices, and usually consist of a cart supporting a cooking chamber supported thereon. The cooking chamber usually has gas burners in the lower portion of the chamber with a grid structure above the gas burners that supports a heat-absorbing material, such as lava rock, or in the case of higher-end grills, a conductive material, such as multiple sear bars. A cooking grid is positioned above and spaced from the sear bars or lava rock and supports food which is to be cooked.

The gas burners are generally a series of tubes or flat channels having a plurality of small openings or apertures on an upper or side surface. Typically, a single manifold feeds gas to the burners through at least one gas control valve, the gas being supplied to the manifold from a gas supply inlet tube linking the manifold to a compressed gas source, such as a liquid propane gas (1 pg)—usually held within a tank stored on the cart below the cooking vessel. A gas flow is brought to the burner assembly where it is ignited to form a flame which serves as a primary heat source for cooking within the cooking chamber. Cooking may be conducted directly by contacting food with the resulting flame, or indirectly by exposure of the food to radiant heat from the sear bars or lava rock discussed previously.

A general principle for the burner assembly is to provide an even distribution of heat throughout the cooking surface of the cooking chamber. Prior art burners are shown in U.S. Pat. No. 4,267,816 to Koziol; U.S. Pat. No. 4,485,799 to Perez; and, U.S. Pat. No. 4,727,853 to Stephen. The present invention provides improvements to the prior art grills by providing enhanced cooking efficiency and ignitor assemblies.

SUMMARY OF THE INVENTION

In accordance with the present invention, a burner assembly for a barbecue grill having a cooking chamber and a fuel supply is disclosed. The assembly is positioned within the cooking chamber below a cooking grate and comprises a manifold coupled to the fuel supply via a fuel delivery tube, and a plurality of burners in fluid communication with the manifold and spaced within the cooking chamber to define a burner grid having a periphery and an interior, each burner having a plurality of openings along at least a portion of a surface, wherein at least some of the openings of burners arranged along the periphery of the burner grid are configured to direct a flame toward a vertical center plane of the burner grid.

In one embodiment of the present invention, it is an aspect to provide openings which avoid directing a flame toward the periphery of the burner grid. The openings of burners on the interior of the burner grid are preferably arranged to direct a flame substantially perpendicular to a plane defined by the burner grid.

It is further included as an aspect of the present invention to provide a burner assembly for a barbecue grill comprising a manifold coupled to the fuel supply via a fuel supply delivery tube and three individual burners. Each of the burners preferably has a plurality of apertures and is in fluid communication with the manifold. A middle burner is also equipped with a first keyed connecting mechanism for coupling to a crossover tube. The crossover tube preferably has a plurality of apertures and first and second open ends, wherein the first open end of the crossover tube is in fluid communication with a peripheral burner and the second open end of the crossover tube is in fluid communication with another peripheral burner, and the keyed connecting mechanism of the second burner singly engages the crossover tube between the first and second open ends.

Another aspect of the present invention provides a burner assembly wherein the plurality of apertures of the peripheral burners are arranged to direct a flame at an angle (θ) to a plane defined by the burners. The inclination of the flame is preferably toward the second burner, and preferably within the range of angle inclinations from about 0° to about 85°. That is, from a horizontal position to approaching a near complete vertical position. The apertures of the second burner are preferably arranged to direct a flame substantially perpendicular to a plane defined by the burners.

In still another embodiment of the present invention, a burner assembly is provided comprising a manifold coupled to the fuel supply via a fuel supply delivery tube, at least two outer burners each having a plurality of apertures and being in fluid communication with the manifold, and at least one inner burner having a plurality of apertures and a keyed connecting mechanism, wherein the inner burners are arranged between the outer burners and are in fluid communication with the gas manifold. A crossover tube is also a component, having a plurality of apertures and first and second open ends, wherein the first open end of the crossover tube is in fluid communication with at least one of the at least two outer burners and the second open end of the crossover tube is in fluid communication with at least another of the at least two outer burners, and the keyed connecting mechanism of the at least one inner burner singly engages the crossover tube between the first and second open ends.

These and other aspects of the present invention set forth in the appended claims may be realized in accordance with the following disclosure with particular reference to the accompanying drawings.

DESCRIPTION OF THE DRAWINGS

FIG. 3 is a top view of an embodiment of the present burner assembly;

FIG. 4 is a bottom view of the burner assembly shown in FIG. 3;

DETAILED DESCRIPTION OF PREFERRED EMBODIMENT

While the invention is susceptible of embodiment in many different forms, this disclosure describes, in detail, preferred embodiments of the invention with the understanding that the present disclosure is to be considered as an exemplification of the principles of the invention and is not intended to limit the broad aspects of the invention to the embodiments illustrated.

Referring generally to the appended FIGS. 1 through 8, the burner assembly of the present invention can be more readily understood. The disclosed assembly is generally referenced by the number "10" in the following disclosure and drawings. Other components are similarly and consistently numbered throughout. While the present invention is particularly designed for portable gas barbecue grills—such as, for example, the GENESIS® series and SUMMIT® series grills manufactured and distributed by Weber-Stephen Products Co. of Palatine, Ill.—other such barbecue grills may be capable of adaptation for implementation of the present assembly as well.

Figure 2:
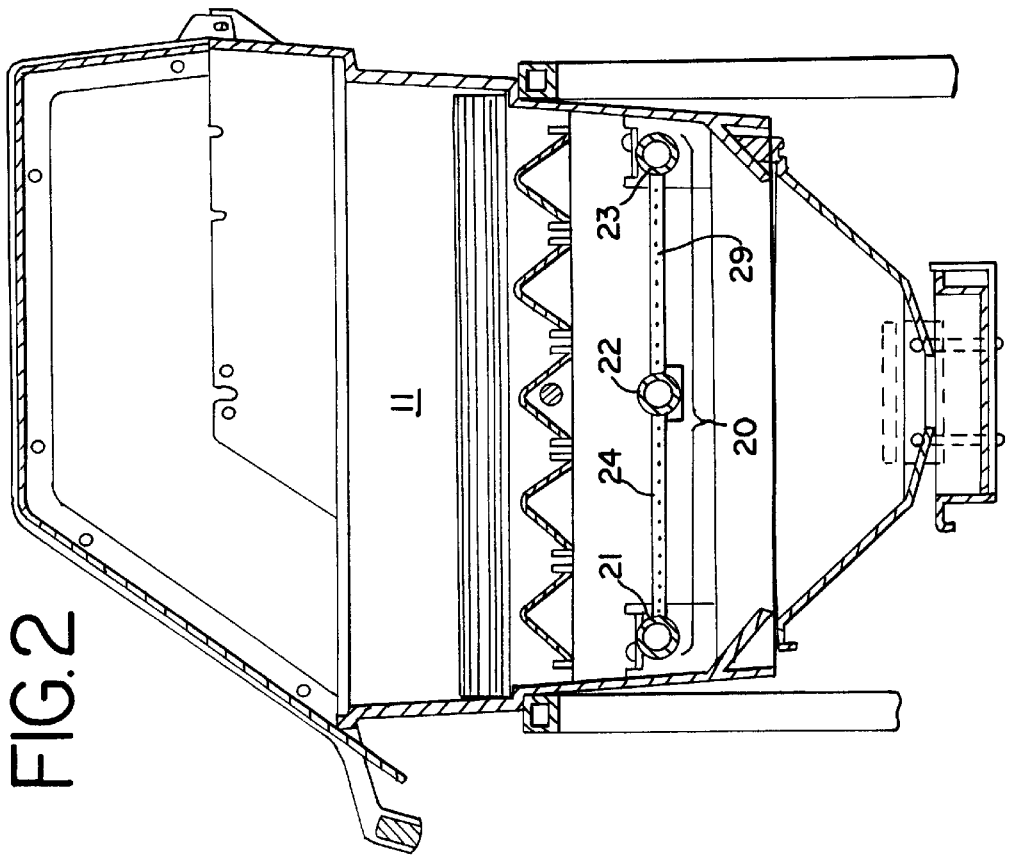
FIG. 2 is a side cross-sectional view of a portable grill showing an embodiment of the present burner assembly in a cooking chamber.
Figure 1:
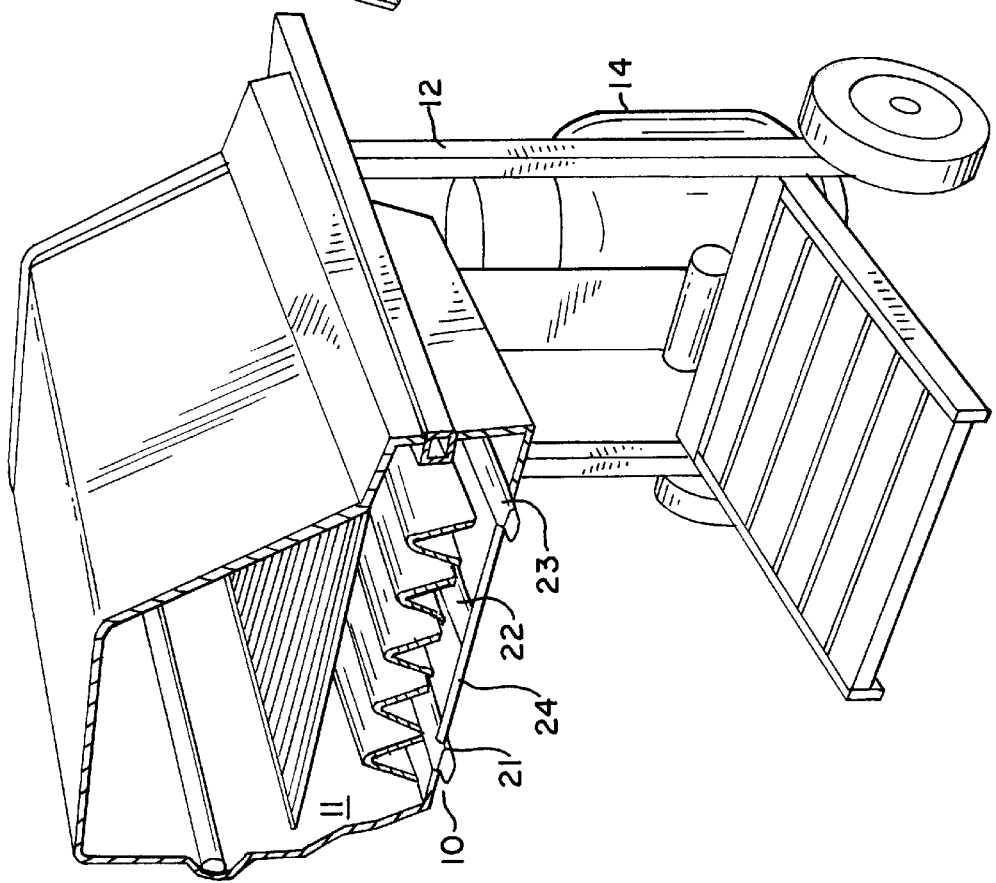
FIG. 1 is a perspective view of a portable grill with a cut-away section to show one embodiment of the present burner assembly in its intended environment.
Figure 5:
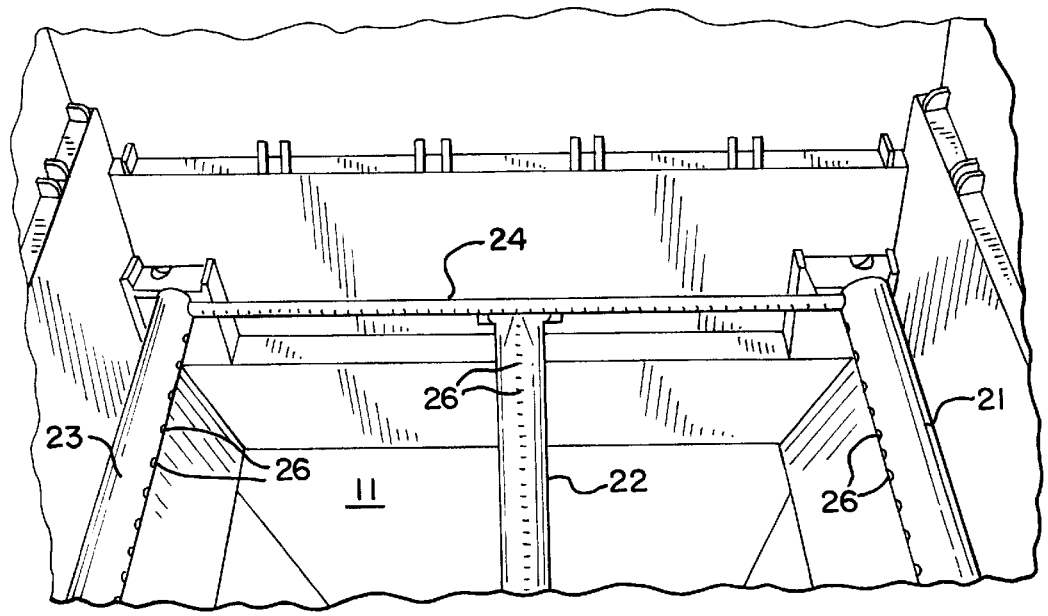
FIG. 5 is a top perspective view into a cooking chamber of a gas barbecue grill showing the closed end portion of one embodiment of the present burner assembly.

As shown in FIGS. 1 and 2, the present burner assembly 10 may be contained within a generally standard gas barbecue grill having a cooking chamber 11 mounted onto a cart 12, and a fuel supply 14. The burner assembly 10 of the present embodiment is preferably formed of at least three burners 21, 22, 23, a crossover tube 24, and a gas manifold 16 (FIG. 3). The fuel supply 14 is connected via a regulator and supply line (not shown) to the gas manifold 16. A flow of fuel, such as propane gas, is brought from the fuel supply 14 through a supply line into the manifold 16 and distributed to the burners 21, 22, 23 as permitted by the control valves 30 (FIG. 3). An igniter (not shown) can be used to ignite the fuel as it flows from a plurality of openings or apertures 26 in each tube. The resulting flame provides the necessary heat source for cooking with the barbecue grill. Further operation of each of these and other ancillary components not specifically addressed herein is conventional and is known and understood by those skilled in the art.

Referring to FIGS. 3 and 4, the three burner tubes can be more readily understood as they form a burner grid 20. Tubes 21 and 23 form the periphery of grid 20 and tube 22 lays within the inside of the burner grid 20. While the present preferred embodiment is shown to have three tubes, it is contemplated that a greater number of burner tubes would be possible without significant modification to the present invention. Similarly, the tube configuration of the present burners is only a preferred embodiment. Other adequate configurations may include flat channeled burners, ring burners, and the like.

The burner tubes are preferably equidistantly spaced, as illustrated in FIGS. 3 through 6, and lie substantially within a single horizontal plane a—a. At one end of each tube is a venturi configuration 32 (including the venturi 33 and the venturi fin 34), an air shutter 36, and an opening (not shown) which is connected to a gas control valve 38 operated by a conventional knob control 39. This end of each tube is attached to and in fluid communication with the single gas manifold 16. This portion of each burner tube is generally positioned on the outside of the cooking chamber 11. The remaining portion of each burner tubes is positioned within the cooking chamber 11, entering through openings in the sidewalls (not shown).

Figure 6:
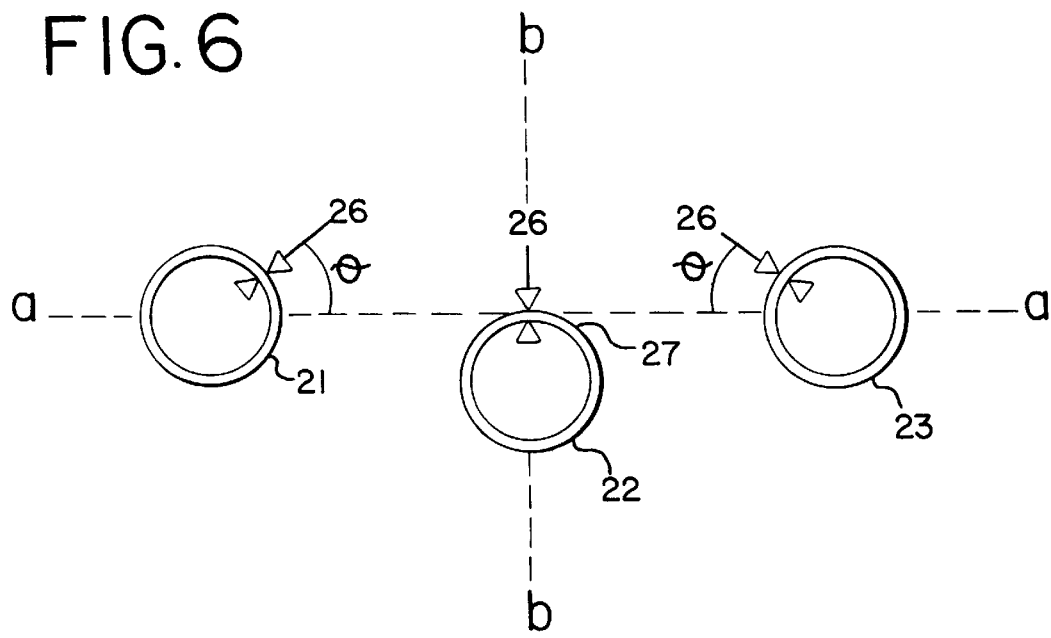
FIG. 6 is an elevated side cross-section of a three burner assembly illustrating a preferred direction of the flame during use, and includes illustration of relevant planes a—a and b—b, and the angle of inclination (θ)

The portion of each burner tube within the chamber 11 preferably has a plurality of small openings 26 which permit the gas flow to emit from the burners. The openings 26 for each individual burner tube 21, 22, 23 preferably begin at a point proximate to where the tube enters the cooking chamber 11 and continue substantially regularly toward and until the opposite closed end 25 of each burner tube, as shown in FIG. 3. Alternatively, the openings 26, may be sporadically spaced on the burner tube, or continue for a short or several short intermittent lengths. The openings 26 as described may also be aligned linearly along the burner length to discharge gas fuel in a uniform direction. Referring to FIG. 6, the indicator arrows show the preferred point of alignment for the openings 26 of each burner tube 21, 22, 23. It is believed that periphery burner tubes 21, 23 which direct a flame toward the middle burner tube 22 at an inclined angle (θ), or more accurately toward a plane b—b perpendicular to the plane a—a of the burners, as illustrated in FIG. 6, is best for evenly distributing heat within the cooking chamber 11. Naturally, not all the openings 26 of each periphery burner tube 21, 23 must be aligned. With a suitable range of inclination angles (θ) between 0° and 85°, some, most or all the openings 26 may be set to direct a flame at various angles within the range. Other openings on burner tubes 21, 23 may be set to direct a flame at an angle outside of the stated preferred range. The openings 26 of interior or middle tube 22 should be set preferably to direct a flame substantially vertically (i.e., perpendicular to the plane of the burner tubes). Where additional burners are employed, burners on the periphery of the burner grid should preferably have openings which direct a flame toward a plane perpendicular to a plane of the burner tubes, while the remaining burners should have openings which direct a flame vertically (i.e., perpendicular to the plane of the burner tubes).

Figure 7:
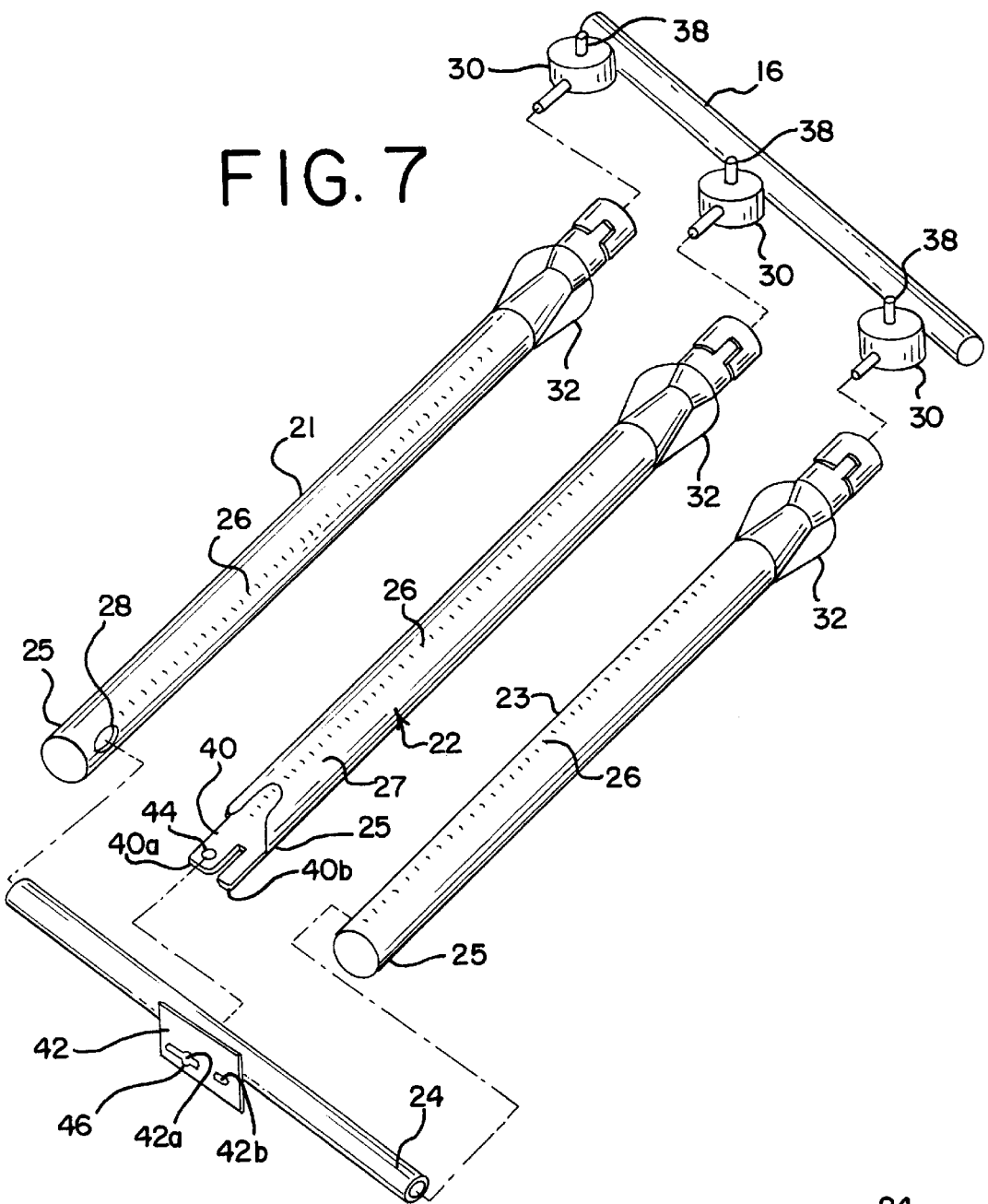
FIG. 7 is an exploded view of the embodiment of the burner assembly illustrated in FIGS. 3 and 4.

Referring now to FIG. 7, the closed end 25 of each burner tube can be seen. Here the end of each burner tube may be pinched, capped, or closed off by any other suitable means. The closed end 25 ensures that a sufficient quantity and pressure of gas is emitted from the openings 26 of each burner tube, accomplishing better heat distribution within the cooking chamber 11. Additionally, with respect to periphery burner tubes 21, 23, a small orifice 28 is provided proximate the closed end 25 to allow the insertion of crossover tube 24.

The crossover tube 24 is a smaller tube open at both ends and having a plurality of openings or apertures 29 along its length. The crossover tube 24 serves to ignite the fuel of secondary burners when they are in use. That is, in many gas barbecue grills an ignitor button is used to ignite the fuel of a single burner, designated the "primary" burner. Similarly, where a match may be used to light the burners, it is often the case that a match hole is provide proximate to a single "primary" burner. In either case, all remaining burners are then designated "secondary" burners. Because the crossover tube 24 is in fluid communication with the primary burner—in the present case, either periphery tube 21, 23 could be used as the primary burner—gas is passed through the crossover tube 24 emitting from the plurality of spaced openings or apertures 29 where it is ignited by the flame of the primary burner. As the control valves of the respective secondary burners are opened, the crossover tube 24 ignites the emitting fuel.

Figure 8:
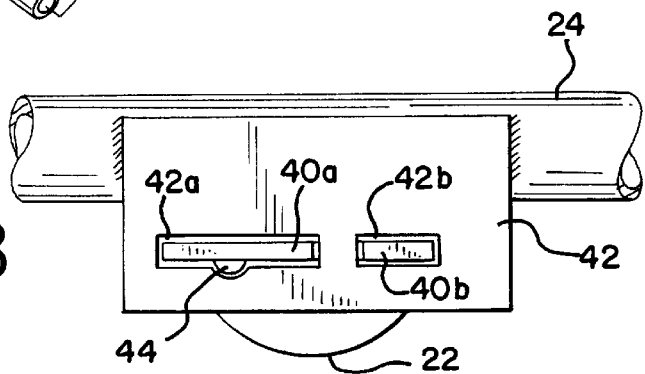
FIG. 8 is a close-up sectional view of the keyed connecting mechanisms used on inner burners and the crossover tube.

As shown in FIG. 8, the crossover tube 24 is not in fluid communication with middle burner tube 22 (nor would it be with subsequent interior burner tubes) and the emitted flame of the crossover tube 24 is relatively small compared to the burner tubes. For these reasons the openings 29 of crossover tube 24 are preferably along a side of crossover tube 24 so as to be in a close spatial relationship to the openings of middle burner tube 22. This provides the quickest and safest ignition of middle burner tube 22.

Because many of these portable gas barbecue grills are bought for home use and assembled oftentimes by unknowledgeable consumers, and because each is connected to a flammable fuel source, safety is a very important feature. Particularly it is preferable for failsafe mechanisms which prevent key components, such as those of the burner assembly, from being improperly connected. Improper connections between any of the fuel carrying components could result in damage, inefficient use, or even harm to users.

In the realization of this issue, the present invention provides keyed connection of the crossover tube 24 to the middle burner tube 22. As shown in FIG. 7, middle burner tube 22 has a pinched closure at close end 25 forming a substantially flat flange 40. The flange 40 is notched to produce two flange sections 40a and 40b of preferably different sizes. A flat metal stock 42 having openings 42a and 42b which correspond to the sizes of flange sections 40a and 40b, respectively, is permanently attached to crossover tube 24, such that the metal stock 42 depends downward from the crossover tube 24 openings 29. This particular configuration prevents the crossover tube 24 from being mis-attached to the middle burner 22 (i.e., backwards). It will be recognized by those skilled in the art that an indefinite number of different keyed configurations exist, and the present invention should be in no way limited to the disclosed configuration. The term "keyed" is meant to include any configuration which permits connection between the middle burner tube 22 and the crossover tube 24 in only one way. Further, because the preferred embodiment has a middle burner 22 with openings 26 aligned with the top central region of the tube 22, the crossover tube 24 should have openings 29 in close proximity to the top central region of the middle burner 22. The keyed connection provides such a suitable connection of the middle burner 22 for proximity of openings 29 and 26 to one another.

In the present embodiment, the metal stock 42 is attached at the middle of crossover tube 24, but may be alternately attached along the length of crossover tube 24. To allow abutting of the crossover tube 24 to the non-pinched end of the middle burner tube 22, the metal stock 42 may be attached to the side opposite the openings 29 on the crossover tube 24. The placement of the second keyed connecting mechanism (i.e., the metal stock 42) on the crossover tube 24 in the present embodiment results in a slight progressive downward angle of the middle burner tube 22 relative to the periphery burner tubes 21, 23, as illustrated in FIG. 6. The drop at the closed end of middle burner tube 22 is due to the connection being made at the underside of the crossover tube 24, and is approximately equal to one-half the diameter of the crossover tube 24.

The metal stock 42 is preferably formed as a depending tab of metal that extends downward from the crossover tube 24 below the openings 29. This tab 42 provides a receiver for middle burner tubes 22 below the crossover tube 24 such that the middle burner tubes 22 have an upper segment 27 proximal to the crossover tube openings 29, at a position generally along plane a—a. This unique securement assembly for the middle burners provides alignment of the crossover tube openings 29 with the middle burner tube openings 26 that are located on the top segment 27 of the middle burner tubes.

The keyed arrangement of the middle burners 22 to the crossover tube 24 is in the arrangement of a projection of the burner fitting into a receiver of the crossover tube. This allows direct insertion of the middle tube during manufacture. As another added feature of the keyed connecting mechanism, in order to prevent the crossover tube 24 from being installed backwards, a boss 44 may be placed on a surface of either flange section 40a or 40b as shown in FIG. 8. A mating provided on the passageway 46 is then metal stock 42 to provide suitable keyed fitting arrangement of the boss 44 passing through the mating passageway 46. Alternative arrangements of the boss 44 and passageway 46 are available, such as placing the boss 44 on the extended metal stock 42 and the passageway 46 on the burner end 40. Again, other devices known by those skilled in the art may be used which would accomplish the desired effect of single engagement.

While specific embodiments have been illustrated and described, numerous modifications are possible without departing from the spirit of the invention, and the scope of protection is only limited by the scope of the accompanying claims.

We claim:

1. A burner assembly for a gas barbecue grill having a cooking chamber and a fuel supply, the assembly being positioned within the cooking chamber and comprising:
   a manifold coupled to the fuel supply via a fuel delivery tube;
   a plurality of burners in fluid communication with the manifold and spaced within the cooking chamber to define a burner grid having a periphery and an interior, each burner having a plurality of openings along at least a portion of a surface, wherein all of the openings of burners arranged along the periphery of the burner grid are configured to direct a flame toward a central region above the burner grid.

2. The burner assembly of claim 1, wherein the openings of a burner arranged on the interior of the burner grid directs a flame substantially along a vertical plane defined through the burner.

3. The burner assembly of claim 2, wherein the burners arranged on the interior of the burner grid comprise a keyed connecting mechanism with a crossover tube having openings for transferring flame from one burner to another burner.

4. The burner assembly of claim 3 further comprising a crossover tube having a plurality of apertures and first and second open ends, wherein the first open end of the crossover tube is in fluid communication with a first burner and the second open end of the crossover tube is in fluid communication with a second burner, and the keyed connecting mechanism of the burners on the interior of the burner grid singly engage the crossover tube between the first and second open ends at a location below the openings of the crossover tube.

5. The burner assembly of claim 4, wherein the crossover tube comprises a mating keyed connecting mechanism for each burner on the interior of the burner grid.

6. The burner assembly of claim 4, wherein the crossover tube comprises a mating keyed connecting mechanism for at least one of the burners on the interior of the burner grid.

7. A burner assembly for a barbecue grill having a cooking chamber and a fuel supply, the burner assembly comprising:
   a manifold coupled to the fuel supply via a fuel supply delivery tube;
   a first burner having a plurality of apertures and being in fluid communication with the manifold;
   a second burner having a plurality of apertures, a first keyed connecting mechanism, and being in fluid communication with the manifold;

a third burner having a plurality of apertures and being in fluid communication with the manifold; and a crossover tube having a plurality of apertures and first and second open ends, wherein the first open end of the crossover tube is in fluid communication with the first burner and the second open end of the crossover tube is in fluid communication with the third burner, and the keyed connecting mechanism of the second burner singly engages the crossover tube between the first and second open ends.

8. The burner assembly of claim 7, wherein the plurality of apertures of the first burner are arranged to direct a flame at an angle inclined to a plane defined by the burners.

9. The burner assembly of claim 8, wherein the flame has an angle of inclination toward a vertical plane including the second burner.

10. The burner assembly of claim 8, wherein the angle of inclination is within the range of about 0° to about 85°.

11. The burner assembly of claim 7, wherein the plurality of apertures of the third burner are arranged to direct a flame at an angle inclined toward a plane defined by the burners.

12. The burner assembly of claim 11, wherein the flame has an angle of inclination toward a vertical plane including the second burner.

13. The burner assembly of claim 11, wherein the angle of inclination is within the range of about 0° to about 85°.

14. The burner assembly of claim 7, wherein the plurality of apertures of the second burner are arranged to direct a flame substantially perpendicular to a plane defined by the burners.

15. The burner assembly of claim 7, wherein the keyed connecting mechanism of the second burner is a notched flange.

16. The burner assembly of claim 15, wherein the crossover tube further comprises a second keyed connecting mechanism attached proximate a center of the crossover tube.

17. The burner assembly of claim 16, wherein the first keyed connecting mechanism is designed to couple with the second keyed connecting mechanism in only one position.

18. A burner assembly for a barbecue grill having a cooking chamber and a fuel supply, the burner assembly comprising:

a manifold coupled to the fuel supply via a fuel supply delivery tube;

at least two outer burners each having a plurality of apertures and being in fluid communication with the manifold;

at least one inner burner having a plurality of apertures and a keyed connecting mechanism, wherein the inner burners are arranged between the outer burners and are in fluid communication with the gas manifold; and a crossover tube having a plurality of apertures and first and second open ends, wherein the first open end of the crossover tube is in fluid communication with at least one of the at least two outer burners and the second open end of the crossover tube is in fluid communication with at least another of the at least two outer burners, and the keyed connecting mechanism of the at least one inner burner singly engages the crossover tube between the first and second open ends.

19. The burner assembly of claim 18, wherein the plurality of apertures of the at least two outer burners are arranged to direct a flame at an angle inclined to a plane defined by the burners.

20. The burner assembly of claim 19, wherein the flame has an angle of inclination toward a vertical plane including the at least one inner burner.

21. The burner assembly of claim 19, wherein the angle of inclination is within the range of about 0° to about 85°.

22. The burner assembly of claim 18, wherein the plurality of apertures of the at least one inner burner are arranged to direct a flame substantially perpendicular to a plane defined by the burners.

23. The burner assembly of claim 18, wherein the keyed connecting mechanism of the at least one inner burner is a notched flange.

24. The burner assembly of claim 23, wherein the crossover tube further comprises a second keyed connecting mechanism attached proximate a center of the crossover tube.

25. The burner assembly of claim 24, wherein the first keyed connecting mechanism is designed to couple with the second keyed connecting mechanism in only one position.

* * * * *